US012661788B2

(12) United States Patent
Imamura

(10) Patent No.: US 12,661,788 B2
(45) Date of Patent: Jun. 23, 2026

(54) MANIPULATION APPARATUS, ROBOT SYSTEM, MANIPULATION APPARATUS CONTROL METHOD, AND ROBOT SYSTEM CONTROL METHOD

(71) Applicant: CANON KABUSHIKI KAISHA, Tokyo (JP)

(72) Inventor: Seigo Imamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 18/170,414

(22) Filed: Feb. 16, 2023

(65) Prior Publication Data

US 2023/0264353 A1      Aug. 24, 2023

(30) Foreign Application Priority Data

Feb. 21, 2022    (JP) ................................. 2022-024424
Feb. 2, 2023    (JP) ................................. 2023-014379

(51) Int. Cl.
*B25J 9/16*          (2006.01)
*G05B 19/409*          (2006.01)

(52) U.S. Cl.
CPC ........... *B25J 9/1666* (2013.01); *B25J 9/1656* (2013.01); *G05B 19/409* (2013.01); *G05B 2219/32351* (2013.01); *G05B 2219/39446* (2013.01)

(58) Field of Classification Search
CPC ..... B25J 9/1666; B25J 9/1656; G05B 19/409; G05B 2219/32351; G05B 2219/39446; G05B 2219/39137
See application file for complete search history.

(56) References Cited

U.S. PATENT DOCUMENTS

| | | | | |
|---|---|---|---|---|
| 5,937,143 A | * | 8/1999 | Watanabe .............. | B25J 9/1671 |
| | | | | 700/264 |
| 2004/0189631 A1 | * | 9/2004 | Kazi ..................... | G06T 19/006 |
| | | | | 345/418 |
| 2007/0242073 A1 | * | 10/2007 | Nagatsuka ............. | B25J 9/1671 |
| | | | | 345/474 |
| 2010/0145515 A1 | * | 6/2010 | Nakanishi .............. | B25J 9/1676 |
| | | | | 700/255 |
| 2010/0241289 A1 | * | 9/2010 | Sandberg ............. | G05D 1/2249 |
| | | | | 701/2 |
| 2015/0066212 A1 | * | 3/2015 | Yahaba ................ | G05B 19/409 |
| | | | | 700/275 |
| 2015/0151431 A1 | * | 6/2015 | Suyama ................ | B25J 9/1605 |
| | | | | 901/5 |
| 2016/0100899 A1 | * | 4/2016 | Jinno ..................... | A61B 34/37 |
| | | | | 606/130 |

(Continued)

FOREIGN PATENT DOCUMENTS

| | | | | | |
|---|---|---|---|---|---|
| DE | 102012205279 A1 | * | 10/2013 | ............ | B25J 9/1633 |
| JP | 2000246684 A | | 9/2000 | | |

(Continued)

*Primary Examiner* — Abby Lin
*Assistant Examiner* — Karston G. Evans
(74) *Attorney, Agent, or Firm* — Canon U.S.A., Inc. IP Division

(57)          ABSTRACT

A manipulation apparatus configured to manipulate a robot includes a processor configured to, in a case where the robot interferes with an object and on a basis of a direction in which the robot receives a load from the object, determine a manipulation direction in which a manipulation of the robot is acceptable.

24 Claims, 12 Drawing Sheets

(56)            References Cited

U.S. PATENT DOCUMENTS

| | | | |
|---|---|---|---|
| 2016/0279796 A1* | 9/2016 | Naitou | B25J 19/06 |
| 2017/0144300 A1* | 5/2017 | Oumi | B25J 9/161 |
| 2018/0012086 A1* | 1/2018 | Eskridge | G05D 1/0038 |
| 2018/0297204 A1* | 10/2018 | Krasny | B25J 9/163 |
| 2019/0126476 A1* | 5/2019 | Nakamura | B25J 9/1676 |
| 2021/0154845 A1* | 5/2021 | Kokubun | G06F 3/048 |
| 2022/0134571 A1* | 5/2022 | Takeuchi | B25J 9/1694 |
| | | | 700/259 |
| 2023/0138217 A1* | 5/2023 | Byner | B25J 9/1602 |
| | | | 700/245 |

FOREIGN PATENT DOCUMENTS

| | | | | |
|---|---|---|---|---|
| JP | 2018051686 A | | 4/2018 | |
| JP | 2018134059 A | | 8/2018 | |
| JP | 2018144171 A | | 9/2018 | |
| KR | 20200107461 A | * | 9/2020 | B25J 9/1602 |

* cited by examiner

304

10I

113I

32

| | 321 | 322 | | 327 | 328 |
| | 323 | 324 | | 329 | 330 |

| JOINT COORDINATE SYSTEM | | | | | |
|---|---|---|---|---|---|
| J1 | − | + | J4 | − | + |
| J2 | − | + | J5 | − | + |
| J3 | − | + | J6 | − | + |

| | 325 | 326 | | 331 | 332 |

304

36

304

36

304

304

MANIPULATION APPARATUS, ROBOT SYSTEM, MANIPULATION APPARATUS CONTROL METHOD, AND ROBOT SYSTEM CONTROL METHOD

BACKGROUND

Field of the Disclosure

The present disclosure relates to robot technology.

Description of the Related Art

A technique of stopping the operation of a robot when the robot collides with, that is, interferes with an object near the robot is known. Japanese Patent Laid-Open No. 2018-051686 discloses a system that, when the robot interferes with an object, operates the robot in a manner of trial and error to restore the robot from the interfering state. In addition, Japanese Patent Laid-Open No. 2018-051686 discloses simulating the operation of restoring from the interfering state by using a 3D model of the robot.

SUMMARY

According to embodiments of the present disclosure, a manipulation apparatus configured to manipulate a robot includes a processor configured to, in a case where the robot interferes with an object and on a basis of a direction in which the robot receives a load from the object, determine a manipulation direction in which a manipulation of the robot is acceptable.

According to embodiments of the present disclosure, a control method for a manipulation apparatus configured to manipulate a robot includes, in a case where the robot interferes with an object and on a basis of a direction in which the robot receives a load from the object, determining a manipulation direction in which a manipulation of the robot is acceptable.

According to embodiments of the present disclosure, a control method for manipulation apparatus configured to manipulate a robot includes, in a case where the robot interferes with an object and on a basis of a direction in which the robot receives a load from the robot, displaying a manipulation direction in which a manipulation of the robot is acceptable, on a display portion.

Further features of the present disclosure will become apparent from the following description of exemplary embodiments with reference to the attached drawings.

DESCRIPTION OF THE EMBODIMENTS

In the method disclosed in Japanese Patent Laid-Open No. 2018-051686, since the robot is operated in a manner of trial and error, an operation of the robot further pressing an object that the robot is in contact with, and an operation that applies an excessive load to the robot are included. In addition, also when performing simulation, although a model of the nearby object is needed in addition to the 3D model of the robot, the object near the robot is not necessarily disposed at a fixed position with respect to the robot.

The present disclosure enables efficiently restoring the robot from the interfering state.

Exemplary embodiments of the present disclosure will be described in detail below with reference to drawings.

First Embodiment

Figure 1:
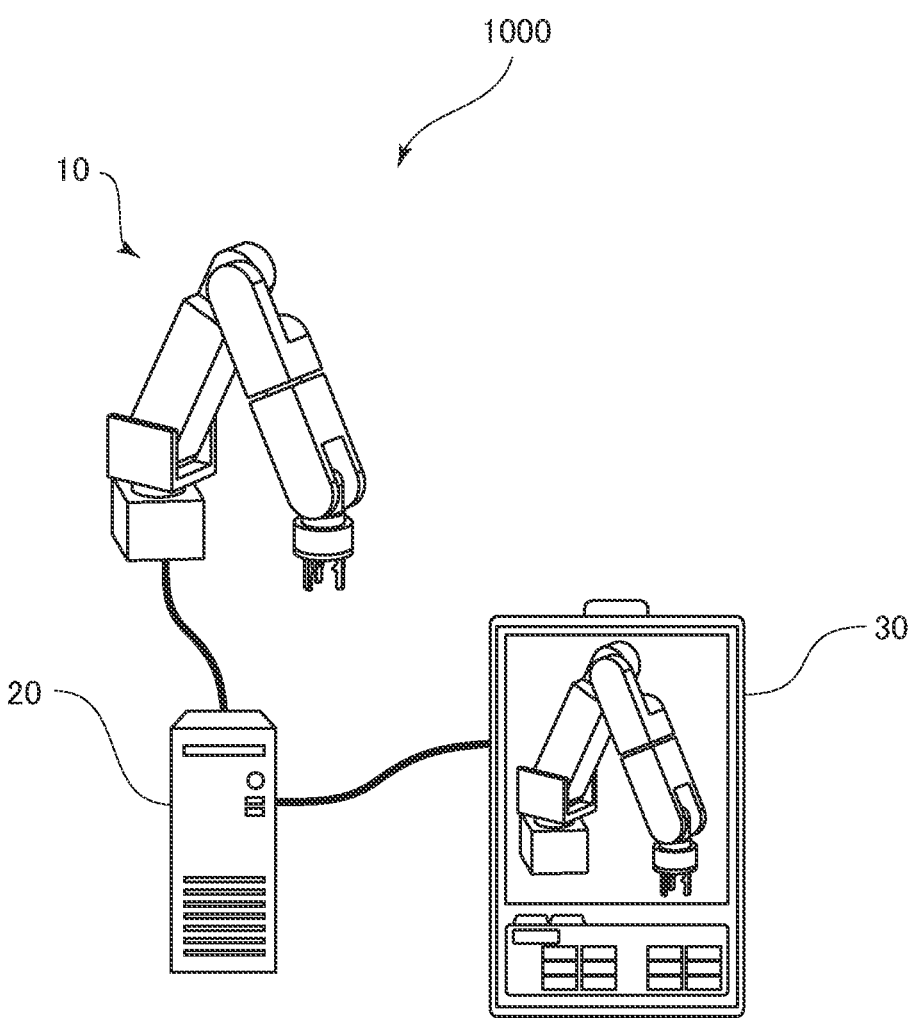
FIG. 1 is an explanatory diagram illustrating a configuration of a robot system according to a first embodiment.

FIG. 1 is an explanatory diagram illustrating a configuration of a robot system 1000 according to a first embodiment. The robot system 1000 includes a robot 10, a controller 20, and a teaching pendant 30 serving as an example of a manipulation apparatus. The robot 10 is an industrial robot, and is a so-called manipulator. The robot 10 and the controller 20 are mutually communicably connected via, for example, a communication cable. The controller 20 and the teaching pendant 30 are mutually communicably connected via, for example, a communication cable.

The controller 20 is configured to control the operation of the robot 10, and is constituted by, for example, a computer. The controller 20 can selectively execute a first mode in which the robot 10 is operated in accordance with teaching data, and a second mode in which the robot 10 is operated in accordance with an instruction from the teaching pendant 30. The controller 20 transitions from the first mode to the second mode when protective stop or emergency stop of the robot 10 is performed while the operation of the robot 10 is controlled in the first mode. Here, detecting abnormality of the robot 10 and stopping the servo mechanism of each motor of the robot 10 without disconnecting will be referred to as protective stop, and detecting abnormality of the robot 10 and disconnecting and stopping the servo mechanism of each motor of the robot 10 will be referred to as emergency stop. In the case where the protective stop of the robot 10 is performed, the first mode is switched to the second mode while maintaining the servo mechanism. In the case where the emergency stop of the robot 10 is performed, the second mode is executed after resetting the servo mechanism on the basis of an instruction from the teaching pendant 30.

The teaching pendant 30 is an input device that a user can manipulate, has a function of transmitting an operation instruction to the controller 20 by being manipulated by the user, and thus can operate the robot 10 in accordance with the manipulation by the user. The controller 20 is configured to operate the robot 10 in accordance with the operation instruction from the teaching pendant 30. As described above, the robot system 1000 is configured such that the robot 10 performs an operation in accordance with the manipulation on the teaching pendant 30 in response to the user manipulating the teaching pendant 30.

Figure 2:
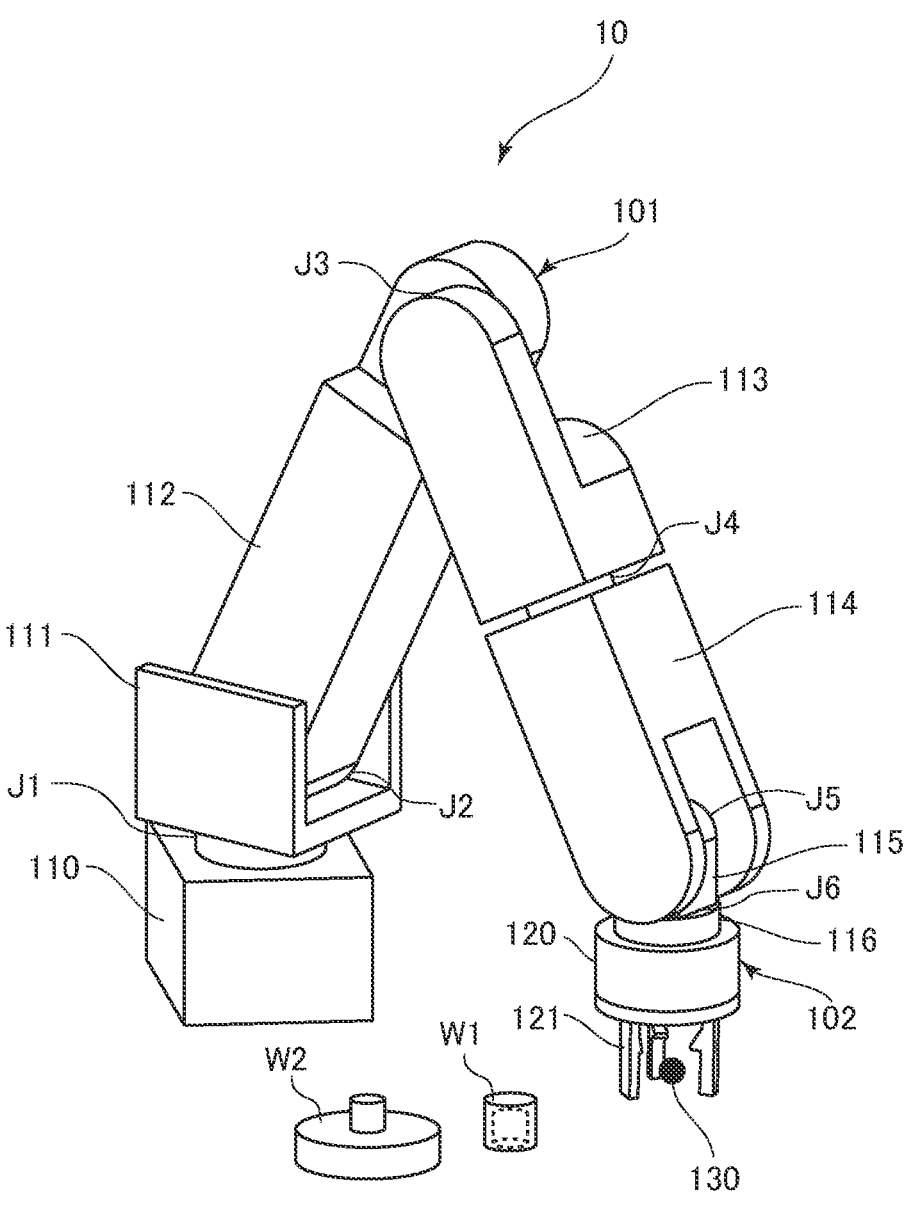
FIG. 2 is an explanatory diagram of a robot according to the first embodiment.

FIG. 2 is an explanatory diagram of the robot 10 according to the first embodiment. The proximal end of the robot 10 is a fixed end, and is fixed to an unillustrated stand or the like. The distal end of the robot 10 is a free end. The robot 10 includes a robot arm 101, and a robot hand 102 that is an example of an end effector attached to the robot arm 101. The robot hand 102 is an example of a distal end of the robot 10.

The robot arm 101 is a robot arm including a plurality of joints J1 to J6. The robot arm 101 is a vertically articulated robot arm. The robot arm 101 includes a base 110 that is a fixed link, and a plurality of links 111 to 116. The base 110 and the links 111 to 116 are interconnected by the joints J1 to J6, and thus the links 111 to 116 are rotatable at the joints J1 to J6.

The joints J1 to J6 are each provided with an unillustrated motor as a drive source. The motors provided in the joints J1 to J6 respectively drive the joints J1 to J6, that is, the links 111 to 116, and thus the robot 10 can take various positions. In the present embodiment, a tool center point: TCP 130 is defined in the distal end of the robot 10, and the robot 10 can be operated to various orientations by designating the position and orientation of the TCP 130. To be noted, although the joints J1 to J6 are each a rotary joint, the configuration is not limited to this, and for example, any of the joints may be a prismatic joint.

The robot hand 102 is configured to be able to hold a workpiece. In the first embodiment, the robot hand 102 includes a hand body 120 including a drive source, and a plurality of fingers 121 supported by the hand body 120, and is configured to be capable of holding a workpiece.

The robot 10 is capable of, in a manufacturing line for manufacturing a product, gripping a workpiece by the robot hand 102 to perform a conveyance work or an assembly work of joining the workpiece to another workpiece, and gripping a tool to perform a processing work of a workpiece. Alternatively, the robot 10 is also capable of performing a work by attaching an actuator different from the robot hand 102 to the link 116 in accordance with the work in the manufacturing process.

For example, workpieces W1 and W2 are disposed around the robot 10. By causing the robot 10 to hold the workpiece W1 and join the workpiece W1 to the workpiece W2, a product that is an assembled product can be manufactured. The assembled product may be an intermediate product or a final product.

Figure 3:
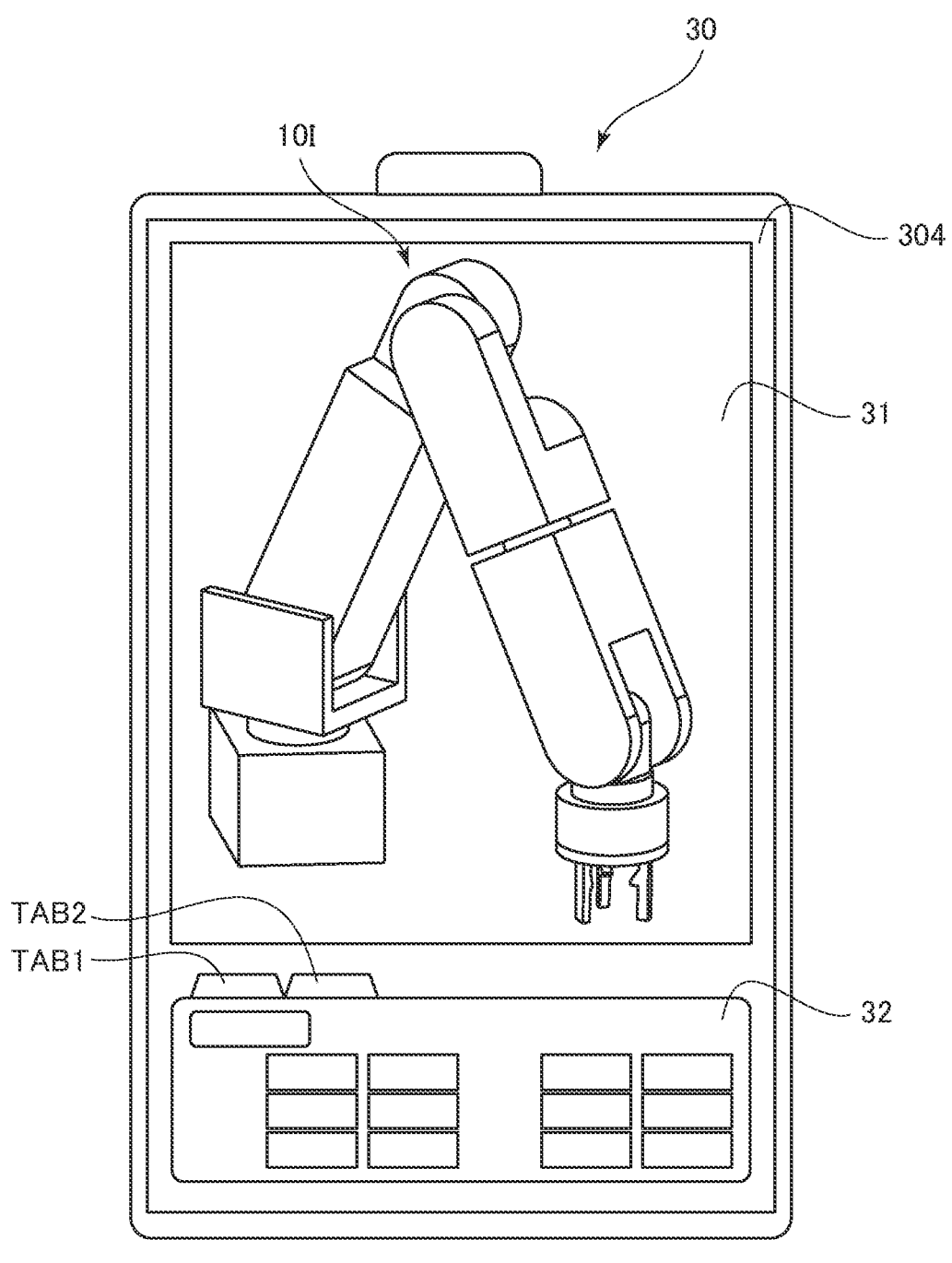
FIG. 3 is an explanatory diagram of a teaching pendant according to the first embodiment.

FIG. 3 is an explanatory diagram of a teaching pendant 30 according to the first embodiment. The teaching pendant 30 includes a touch panel display 304 serving as both an input portion that is an input device and a display portion that is a display device. The touch panel display 304 displays a 3D model display portion 31 and an operation instruction portion 32 as a user interface image: UI image. To be noted, the input portion and the display portion may be configured as separate parts.

Figure 4:
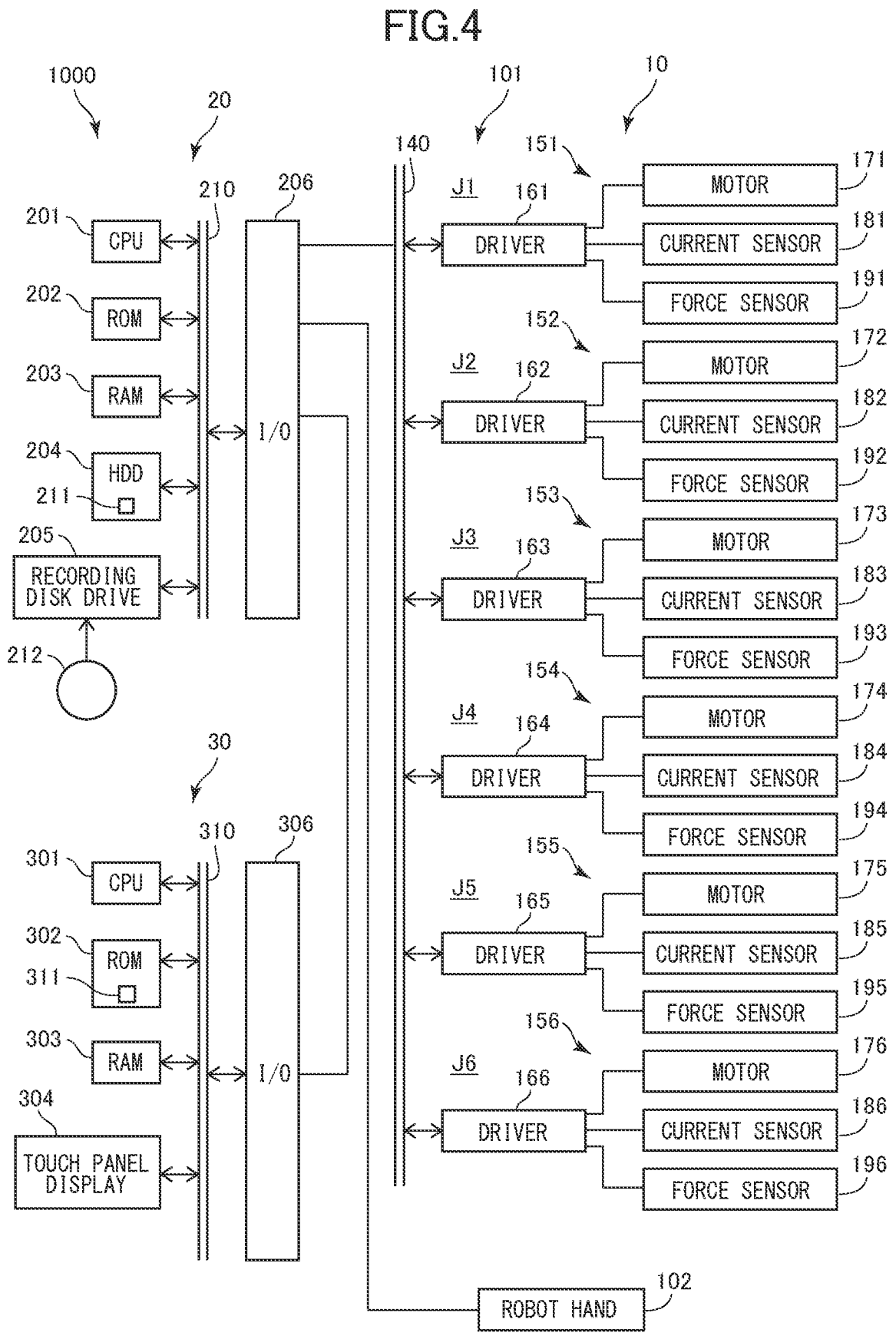
FIG. 4 is a block diagram illustrating a control system of the robot system according to the first embodiment.

FIG. 4 is a block diagram illustrating a control system of a robot system 1000 according to the first embodiment. The controller 20 is constituted by a computer, and includes a central processing unit: CPU 201 that is a processor. In addition, the controller 200 includes a read-only memory: ROM 202, a random access memory: RAM 203, and a hard disk drive: HDD 204 as storage devices. In addition, the controller 20 includes a recording disk drive 205, and input/output: I/O 206 that is an input/output interface. The CPU 201, the ROM 202, the RAM 203, the HDD 204, the recording disk drive 205, and the I/O 206 are mutually communicably connected via a bus 210.

The ROM 202 stores a basic program that is read by the CPU 201 when activating the computer. The RAM 203 is a temporary storage device used for arithmetic processing by the CPU 201. The HDD 204 is a storage device for storing various data such as arithmetic processing results of the CPU 201. In the first embodiment, the HDD 204 stores a program 211 for the CPU 201 to execute. By executing the program 211, the CPU 201 controls the robot 10 in accordance with teaching data, and in the case where a load exceeding a predetermined range is applied to the robot 10, performs control to perform protective stop or emergency stop of the operation of the robot 10. The recording disk drive 205 is capable of reading out various data and programs recorded in a recording disk 212.

The I/O 206 is connected to the robot arm 101, the robot hand 102, and the teaching pendant 30.

The teaching pendant 30 is constituted by a computer, and includes a CPU 301 that is a processor. In addition, the teaching pendant 30 includes a ROM 302 and a RAM 303 as storage devices. In addition, the teaching pendant 30 includes a touch panel display 304, and an I/O 306 that is an input/output interface. The CPU 301, the ROM 302, the RAM 303, the touch panel display 304, and the I/O 306 are mutually communicably connected via a bus 310.

The ROM 302 stores a control program 311 for the CPU 301 to execute. By executing the control program 311, the CPU 301 performs a control method that will be described later. The RAM 303 is a temporary storage device used for arithmetic processing by the CPU 301. The I/O 306 is connected to the I/O 206 of the controller 20.

The robot arm 101 includes six driving units 151 to 156 by the same number as the joints J1 to J6. The driving units 151 to 156 respectively correspond to the joints J1 to J6.

The driving unit 151 includes a driver 161, a motor 171, a current sensor 181, and a force sensor 191. The driving unit 152 includes a driver 162, a motor 172, a current sensor 182, and a force sensor 192. The driving unit 153 includes a driver 163, a motor 173, a current sensor 183, and a force sensor 193. The driving unit 154 includes a driver 164, a motor 174, a current sensor 184, and a force sensor 194. The driving unit 155 includes a driver 165, a motor 175, a current sensor 185, and a force sensor 195. The driving unit 156 includes a driver 166, a motor 176, a current sensor 186, and a force sensor 196.

The drivers 161 to 166 each include an unillustrated microcomputer, an unillustrated A/D conversion circuit, an unillustrated motor driving circuit, and the like. The plurality of drivers 161 to 166 are connected to the I/O 206 of the controller 20 via a bus 140.

The motors 171 to 176 are drive sources that respectively drive the joints J1 to J6. Specifically, the motors 171 to 176 each drive, among two links coupled via one of the joints J1 to J6, a link on the distal end side with respect to a link on the proximal end side, directly or via an unillustrated transmission mechanism such as a reduction gear. The current sensors 181 to 186 respectively detect current supplied to the motors 171 to 176, and respectively output signals indicating current values that are detection results to the drivers 161 to 166.

The force sensors 191 to 196 are each, for example, a torque sensor that detects a force in the rotational direction, that is, a torque, and are respectively disposed in the joints J1 to J6. That is, the force sensors 191 to 196 each detect the force (torque) acting on the link on the distal end side with respect to the link on the proximal end side among the two links coupled via one of the joints J1 to J6, and respectively output signals indicating force values (torque values) serving as detection results to the drivers 161 to 166.

The drivers 161 to 166 respectively receive signals from the current sensors 181 to 186 at a predetermined period, convert the signals into digital signals indicating current values, and output the digital signals to the controller 20. In addition, the drivers 161 to 166 respectively receive signals from the force sensors 191 to 196 at a predetermined period, convert the signals into digital signals indicating force (torque) values, and output the converted signals to the controller 20.

To be noted, although the HDD 204 serves as a non-transitory computer-readable recording medium and stores the program 211 in the first embodiment, the configuration is not limited to this. The program 211 may be stored in any recording medium as long as the recording medium is a non-transitory computer-readable recording medium. For example, as the recording medium that stores the program 211, flexible disks, hard disks, optical disks, magneto-photo disks, magnetic tapes, nonvolatile memories, and the like can be used.

In addition, although the ROM 302 serves as a non-transitory computer-readable recording medium and stores the control program 311 in the first embodiment, the configuration is not limited to this. The control program 311 may be stored in any recording medium as long as the recording medium is a non-transitory computer-readable recording medium. For example, as the recording medium that stores the control program 311, flexible disks, hard disks, optical disks, magneto-photo disks, magnetic tapes, nonvolatile memories, and the like can be used.

According to the configuration described above, the teaching pendant 30 can give instructions of operation to the joints J1 to J6 via the controller 20 in accordance with the manipulation by the user.

Figure 5A:
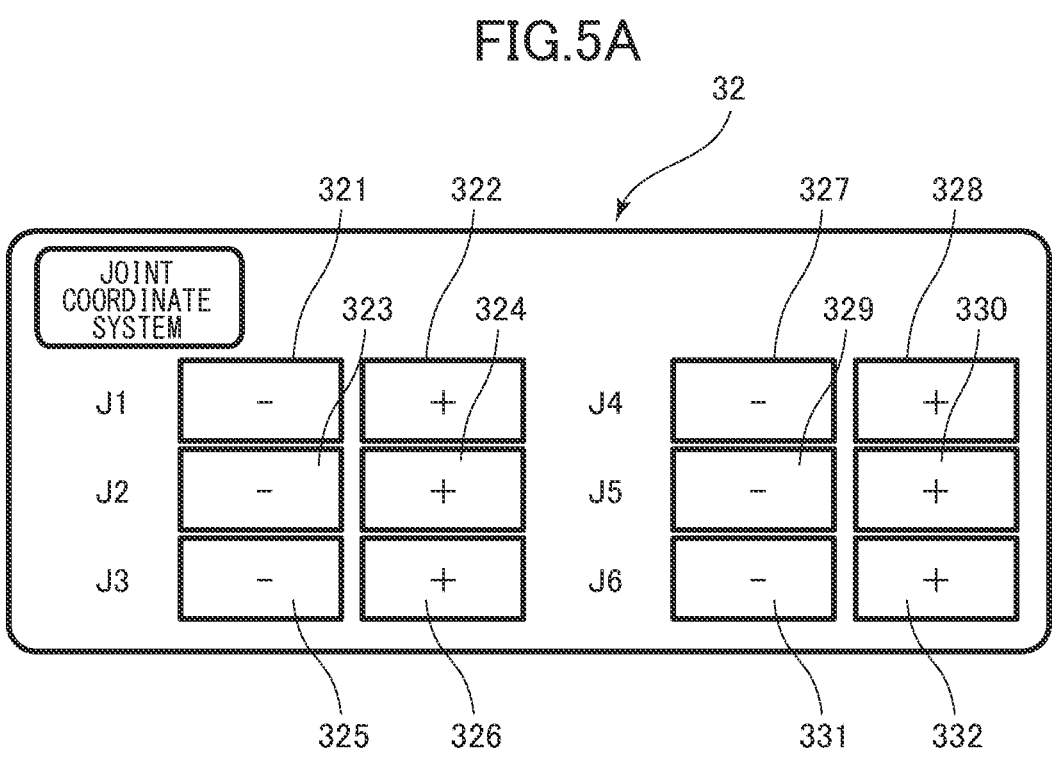
FIG. 5A is an explanatory diagram of an operation instruction portion according to the first embodiment.
Figure 5B:
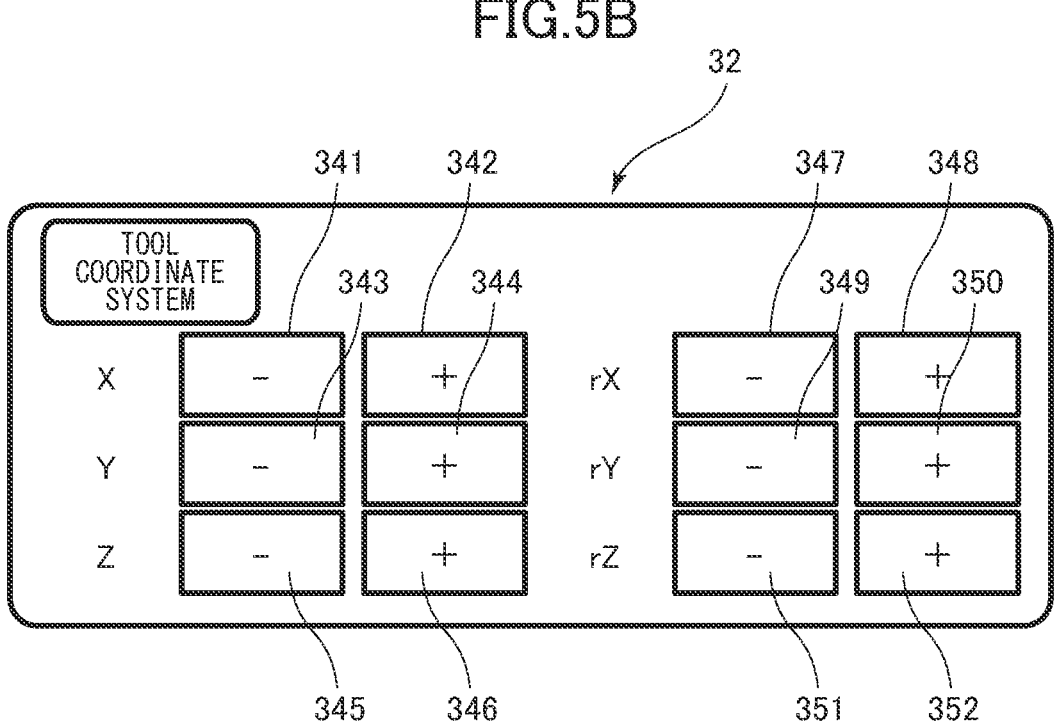
FIG. 5B is an explanatory diagram of an operation instruction portion according to the first embodiment.

FIGS. 5A and 5B are explanatory diagrams of the operation instruction portion 32. The operation instruction portion 32 is a UI image that the user can manipulate such that the robot 10 performs jog operation. In the touch panel display 304 illustrated in FIG. 3, the operation instruction portion 32 is displayed in a manner switchable between the screens illustrated in FIGS. 5A and 5B in tabs TAB1 and TAB2. The tabs TAB1 and TAB2 are selected by the user. FIG. 5A illustrates the operation instruction portion 32 in the case where the tab TAB1 is selected by the user, and FIG. 5B illustrates the operation instruction portion 32 in the case where the tab TAB2 is selected by the user.

The operation instruction portion 32 illustrated in FIG. 5A includes a plurality of manipulation buttons 321 to 332 for instructing the robot 10 to operate in mutually different directions. The operation instruction portion 32 illustrated in FIG. 5A instructs the operation of the robot arm 101 in a joint coordinate system. The joints J1 to J6 are each capable of operating in two opposite directions. In the first embodiment, the joints J1 to J6 are each a rotary joint, and are each therefore capable of operating in two opposite rotational directions. The two manipulation buttons 321 and 322 are each a manipulation button for instructing the joint J1 to operate in corresponding one of the two rotational directions. The two manipulation buttons 323 and 324 are each a manipulation button for instructing the joint J2 to operate in corresponding one of the two rotational directions. The two manipulation buttons 325 and 326 are each a manipulation button for instructing the joint J3 to operate in corresponding one of the two rotational directions. The two manipulation buttons 327 and 328 are each a manipulation button for instructing the joint J4 to operate in corresponding one of the two rotational directions. The two manipulation buttons 329 and 330 are each a manipulation button for instructing the joint J5 to operate in corresponding one of the two rotational directions. The two manipulation buttons 331 and 332 are each a manipulation button for instructing the joint J6 to operate in corresponding one of the two rotational directions.

The operation instruction portion 32 illustrated in FIG. 5B includes a plurality of manipulation buttons 341 to 352 for instructing the robot 10 to operate in mutually different directions. The operation instruction portion 32 illustrated in FIG. 5B instructs the operation of the robot arm 101 in a coordinate system of the TCP 130, which is a tool coordinate system in the first embodiment. In the tool coordinate system, the TCP 130 defined in the robot 10 is movable in three translational directions following three axes orthogonal to each other, and in three rotational directions about the three axes. Further, the distal end of the robot 10, that is, the TCP 130 is capable of moving in two opposite directions among the three translational directions and two opposite directions among the three rotational directions. The three axes in the tool coordinate system will be referred to as an X axis, a Y axis, and a Z axis. Hereinafter, the three translational directions and the three rotational directions will be also collectively referred to as six-axis directions. The six-axis directions include twelve directions including normal directions and reverse directions. The two manipulation buttons 341 and 342 are each a manipulation button for instructing the TCP 130 to operate in corresponding one of the two translational directions along the X axis. The two manipulation buttons 343 and 344 are each a manipulation button for instructing the TCP 130 to operate in corresponding one of the two translational directions along the Y axis. The two manipulation buttons 345 and 346 are each a manipulation button for instructing the TCP 130 to operate in corresponding one of the two translational directions along the Z axis. The two manipulation buttons 347 and 348 are each a manipulation button for instructing the TCP 130 to operate in corresponding one of the two rotational directions about the X axis. The two manipulation buttons 349 and 350 are each a manipulation button for instructing the TCP 130 to operate in corresponding one of the two rotational directions about the Y axis. The two manipulation buttons 351 and 352 are each a manipulation button for instructing the TCP 130 to operate in corresponding one of the two rotational directions about the Z axis.

To be noted, although the operation instruction portion 32 illustrated in FIG. 5B is represented by a tool coordinate system that is an orthogonal coordinate system set with respect to the TCP 130, the configuration is not limited to this, and the coordinate system may be set with respect to any point.

Here, on the basis of the teaching data, the controller 20 performs control to cause the robot 10 to perform a predetermined operation such as an assembly work. At this time, in the case where the robot 10 interferes with an object nearby, the controller 20 controls the robot 10 to perform the protective stop or emergency stop of the operation of the robot 10. In the present embodiment, the "interference" means "collision". That is, "the robot 10 interferes with an object" means that "the robot 10 collides with an object". When the robot 10 interferes with an object, the robot 10 is in contact with the object. That is, when the protective stop or emergency stop of the robot 10 is performed, the robot 10 stops in a state of being in contact with the object. In addition, "the robot 10 is receiving a load" means that the "robot 10 is receiving a load exceeding a predetermined range".

Figure 6:
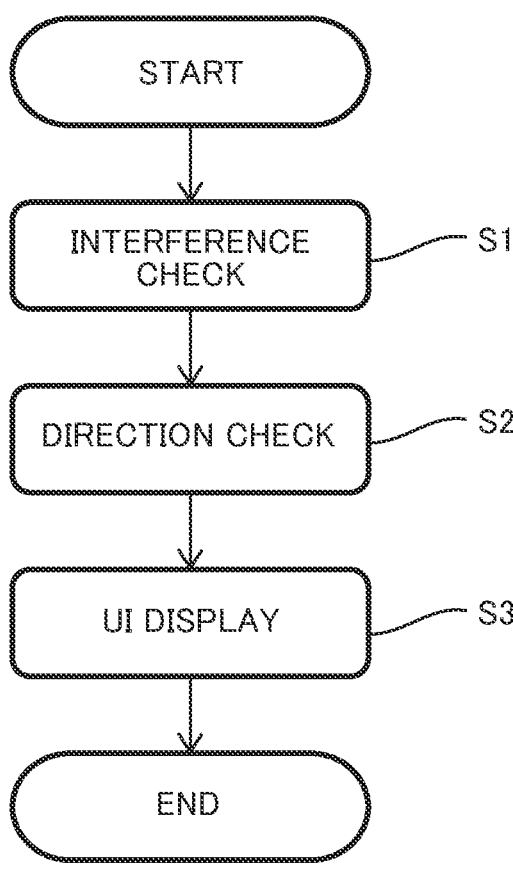
FIG. 6 is a flowchart illustrating a control method for the teaching pendant according to the first embodiment.

A control operation of the teaching pendant 30 in the case where the protective stop or emergency stop of the robot 10 is performed will be described below. FIG. 6 is a flowchart illustrating a control method for the teaching pendant 30 according to the first embodiment. First, a case where the operation instruction portion 32 illustrated in FIG. 5A is selected will be described. In addition, the CPU 301 displays a robot image 101 corresponding to the robot 10 in a 3D model display portion 31 as illustrated in FIG. 3.

In interference checking processing of step S1, the CPU 301 specifies a portion of the robot 10 interfering with a nearby object. In the first embodiment, the CPU 301 specifies a joint receiving a load among the joints J1 to J6 of the robot 10 on the basis of the force values of the force sensors 191 to 196 or the current values of the current sensors 181 to 186. That is, in the case where a force value of the force sensors 191 to 196 or a current value of the current sensors 181 to 186 exceeds a predetermined range, it is determined that the corresponding joint is receiving a load. For example, the CPU 301 determines whether or not the force value of each of the force sensors 191 to 196 exceeds the predetermined range, and specifies a joint corresponding to the force sensor that has output a force value exceeding the predetermined range. Alternatively, for example, the CPU 301 determines whether or not the current value of each of the current sensors 181 to 186 exceeds the predetermined range, and specifies a joint corresponding to the current sensor that has output a current value exceeding the predetermined range.

Next, in direction checking processing of step S2, the CPU 301 specifies, for the joint receiving the load and on the basis of the value of the force sensor or the current sensor corresponding to the joint, a direction in which the load is received. For example, the direction in which the load is received can be specified on the basis of whether the value of the force sensor or the current sensor is a positive value or a negative value. Then, on the basis of direction in which the robot 10 is receiving the load, the CPU 301 determines the manipulation direction in which manipulation for the robot 10 is acceptable. Here, a direction in which the robot 10 receives a load from the object or a direction in which the load that the robot 10 is receiving from the object maintains or increases will also be referred to as an interference direction. The manipulation direction is preferably a direction other than the interference direction, that is, preferably a non-interference direction in which the load that the robot 10 is receiving from the object decreases. For example, the direction in which the load that the robot 10 is receiving from the object decreases includes a direction in which the robot 10 is moved along a direction of the load that the robot 10 is receiving.

Figure 7:
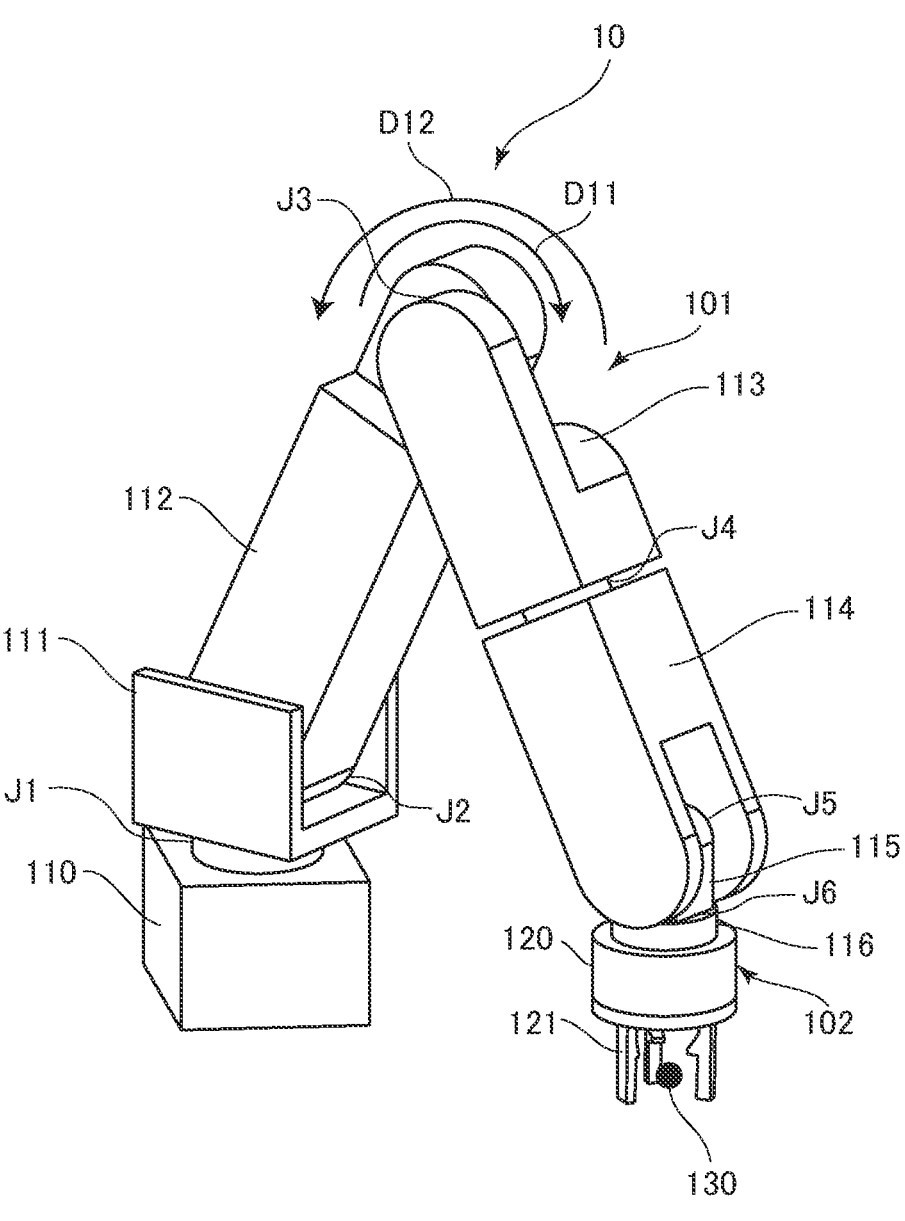
FIG. 7 is an explanatory diagram of the robot according to the first embodiment.

For example, a case where the portion of the robot 10 receiving the load is the joint J3, that is, the link 113 as illustrated in FIG. 7 will be described. The joint J3 is a rotary joint. The joint J3 is movable in two directions D11 and D12, which are rotational directions opposite to each other. The CPU 301 specifies, on the basis of the value of the force sensor 193 or the current sensor 183, the direction in which the load that the robot 10 is receiving from the object decreases among the two directions D11 and D12 of the joint J3. For example, in the case where the direction in which the load that the robot 10 is receiving from the object decreases is the direction D12, the CPU 301 sets the direction D12 as the manipulation direction in which the manipulation is acceptable.

Figures 8A, 8B:
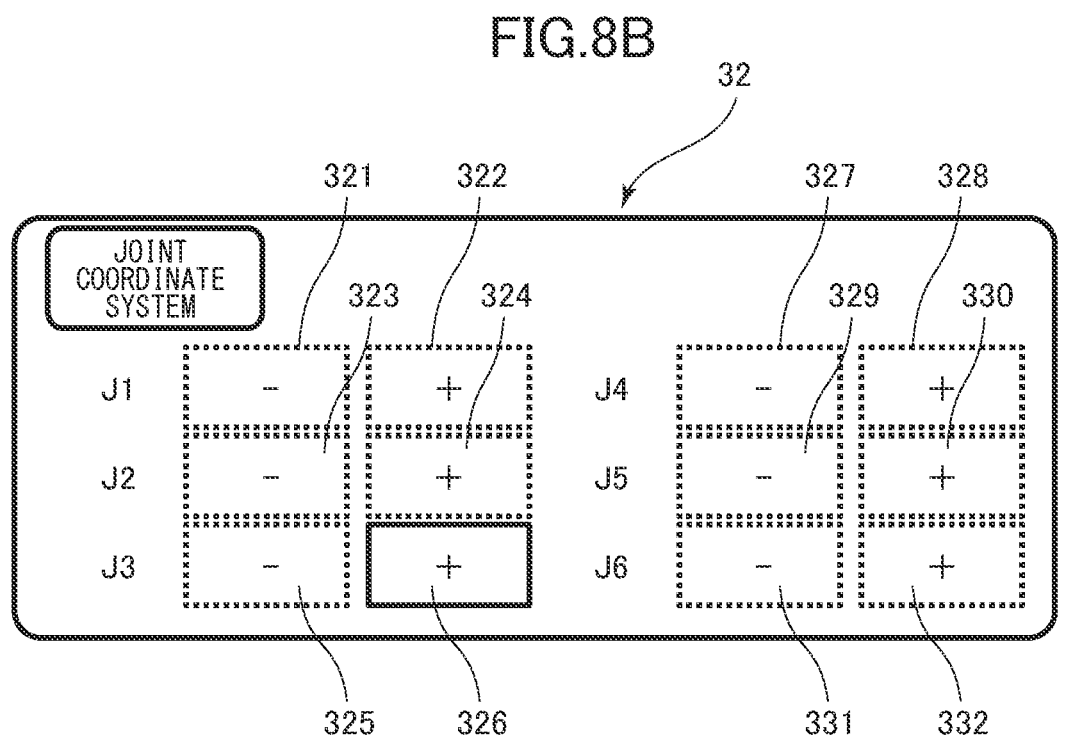
FIG. 8A is an explanatory diagram of an example of a display image according to the first embodiment.
FIG. 8B is an explanatory diagram of an example of a display image according to the first embodiment.

Next, in UI display processing of step S3, the CPU 301 sets the color of a portion of the robot image I10 corresponding to the portion of the robot 10 receiving the load to a different color from the other portions. FIG. 8A is an explanatory diagram of an example of a display image. For example, in the case where the link 113 is the portion receiving the load, a portion 1131 of the robot image I10 corresponding to the link 113 is highlighted in a different color from other portions as illustrated in FIG. 8A. As a result of this, the user can easily recognize the portion of the robot 10 receiving the load from interference by looking at the robot image I10.

In the first embodiment, in step S3, the CPU 301 preferably does not accept manipulation in a direction other than the manipulation direction. For example, in the case where the manipulation direction is the direction D12 in FIG. 7, the CPU 301 does not accept manipulation in a direction other than the direction D12. FIG. 8B is an explanatory diagram of an example of a display image. For example, in FIG. 8B, manipulation on the manipulation buttons 321 to 325 and 327 to 332 other than the manipulation button 326 for instructing the robot 10 to operate in the manipulation direction among the manipulation buttons 321 to 332 is not accepted. The manipulation buttons 321 to 325 and 327 to 332 are manipulation buttons for instructing the robot 10 to operate in directions other than the manipulation direction. For example, the CPU 301 grays out the manipulation buttons 321 to 325 and 327 to 332 such that manipulation of the manipulation buttons 321 to 325 and 327 to 332 other than the manipulation button 326 is not accepted through the operation instruction portion 32. As a result of this, only the manipulation of the manipulation button 326 among the plurality of manipulation buttons 321 to 332 can be accepted by the teaching pendant 30. Further, the user can manipulate only the manipulation button 326, and thus operation of the robot 10 in the direction in which the robot 10 interferes with the object can be avoided.

When the operation instruction portion 32 displaying the UI image is touched by the user and manipulation is accepted, the CPU 301 transmits an operation instruction corresponding to the manipulation by the user to the controller 20, and the controller 20 performs control to operate the robot 10 in accordance with the operation instruction. As described above, the user can operate the robot 10 in the non-interference direction while looking at the screen of the teaching pendant 30. Then, the robot 10 is restored from the state of interfering with the nearby object, and thus the operation of manufacturing the product can be resumed.

As described above, according to the first embodiment, when the robot 10 interferes with an object and the protective stop or emergency stop is performed, a situation in which the user performs a manipulation to operate the robot 10 in the interference direction in which the robot 10 further presses the interfering object can be avoided. Therefore, the robot 10 does not have to be operated randomly, and in which position the object interfering with the robot 10 is disposed does not have to be specified. As a result of this, an excessive load is not applied to the robot 10, and the robot 10 can be efficiently restored from the state in which the robot 10 is interfering with a nearby object.

Modification Example 1

Although the CPU 301 specifies the direction in which the load is received in the joint receiving the load among the joints J1 to J6 as the direction in which the robot 10 is receiving the load by the processing of steps S1 and S2 of FIG. 6 in the first embodiment, the configuration is not limited to this. The CPU 301 may specify, as the direction in which the robot 10 is receiving the load, the direction in which the distal end of the robot 10 is receiving the load. In this case, the user selects the tab TAB2 illustrated in FIG. 3, and the operation instruction portion 32 illustrated in FIG. 5B is displayed on the touch panel display 304.

In Modification Example 1, instead of steps S1 and S2, the CPU 301 obtains force values in the six-axis directions of the force that the distal end of the robot 10 is receiving, by dynamics calculation based on the force values of the force sensors 191 to 196 or the current values of the current sensors 181 to 186. The six-axis directions are the translational directions of three axes orthogonal to each other and the rotational directions about the three axes in the tool coordinate system set with respect to the distal end of the robot 10, and includes twelve directions in total of normal directions and reverse directions. Then, in the case where there is a force value exceeding a predetermined range among the respective force values of the six-axis directions, the CPU 301 specifies the direction in which the robot 10 is receiving the load among the twelve directions. As described above, in the case where the operation instruction portion 32 illustrated in FIG. 5B is selected, the CPU 301 may specify the direction in which the distal end of the robot 10 is receiving the load, and specify the manipulation direction in which the manipulation by the user is acceptable. Also in this case, the manipulation direction is preferably the direction in which the load that the robot 10 is receiving from the object decreases. Further, similarly to FIG. 8B, manipulation buttons other than the manipulation button corresponding to the manipulation direction among the manipulation buttons 341 to 352 illustrated in FIG. 5B may be grayed out such that manipulation in directions other than the manipulation direction by the user is not accepted.

Modification Example 2

Although a case where the robot 10 includes the force sensors 191 to 196 respectively provided in the joints J1 to J6 has been described in the first embodiment, the configuration is not limited to this. For example, a six-axis force sensor capable of detecting force in six axes may be provided in place of or in addition to the force sensors 191 to 196. For example, the six-axis force sensor is preferably disposed between robot arm 101 and the robot hand 102.

Second Embodiment

A second embodiment will be described. To be noted, in the second embodiment, description of elements substantially the same as in the first embodiment will be simplified or omitted. The configuration of the robot system according to the second embodiment is as that described in the first embodiment.

Figure 9A:
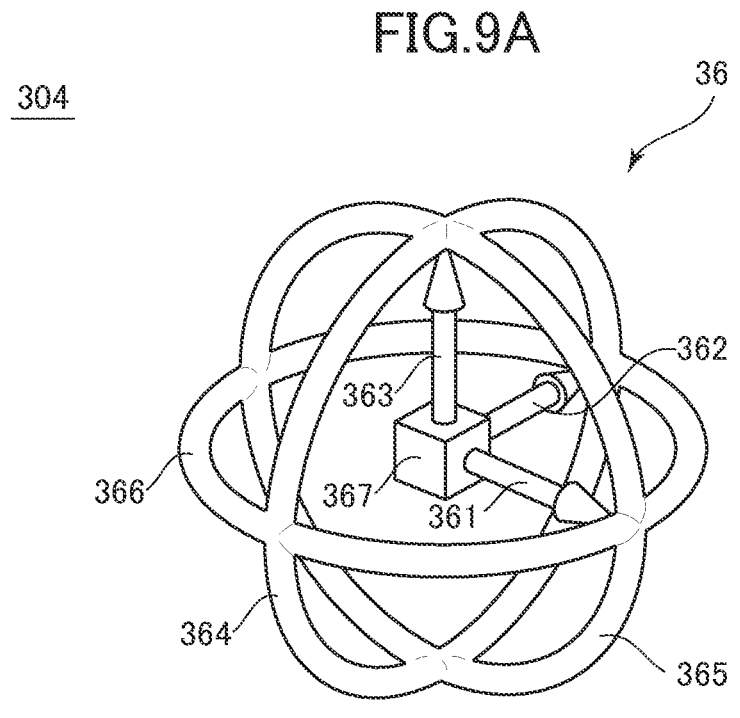
FIG. 9A is an explanatory diagram of an example of a display image according to a second embodiment.

In step S3 illustrated in FIG. 6, the CPU 301 preferably displays information of the manipulation direction on the touch panel display 304. FIG. 9A is an explanatory diagram of an example of a display image according to the second embodiment. For example, regarding the information of the manipulation direction, a model image 36 representing a 3D hand model may be displayed as an operation instruction portion on the touch panel display 304 as illustrated in FIG. 9A. For example, the model image 36 may be displayed at a portion corresponding to the TCP 130 defined in the robot 10 in the robot image 101 illustrated in FIG. 8A.

At this time, the CPU 301 may function the model image 36 as a manipulation button for operating the robot 10 in the manipulation direction. That is, the model image 36 of the second embodiment is an operation instruction portion for operating the TCP 130 with respect to the tool coordinate system. The model image 36 is constituted by an X-axis handle 361, a Y-axis handle 362, a Z-axis handle 363, a tX-axis handle 364, a tY-axis handle 365, a tZ-axis handle 366, and a handle center 367. The X-axis handle 361, the Y-axis handle 362, and the Z-axis handle 363 are manipulation buttons for instructing operation in the translational directions in the tool coordinate system. In addition, the tX-axis handle 364, the tY-axis handle 365, and the tZ-axis handle 366 are manipulation buttons for instructing operation in the rotational directions in the tool coordinate system. For example, the handles 361 to 366 are displayed as arrow images directed in manipulation directions corresponding thereto.

Figure 9B:
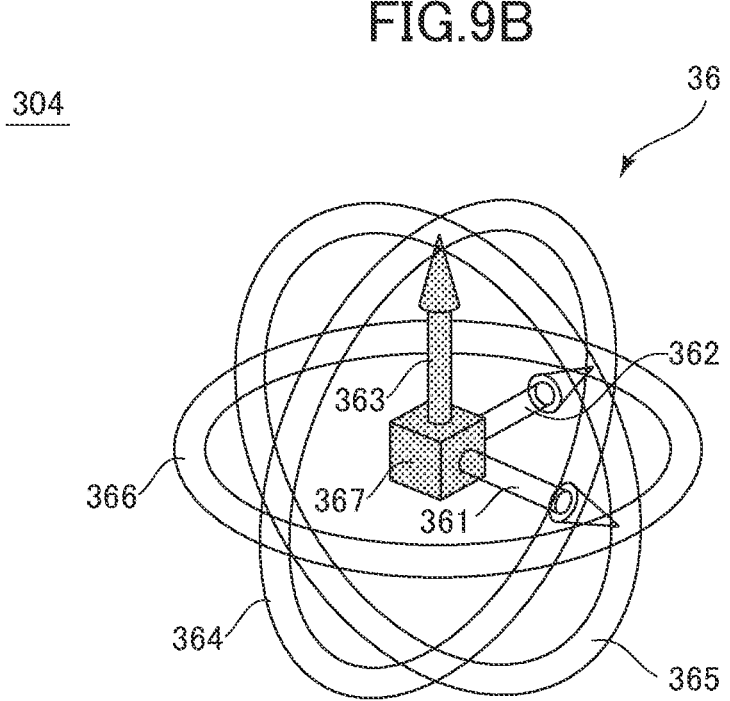
FIG. 9B is an explanatory diagram of an example of a display image according to the second embodiment.

In the model image 36, the CPU 301 makes the manipulation buttons for operating the robot 10 in a direction to interfere with an object transparent to not accept manipulation thereof. For example, the CPU 301 makes the manipulation buttons other than the Z-axis handle 363 transparent to only accept manipulation of the Z-axis handle 363 as illustrated in FIG. 9B. By restricting the operation instruction to the interference direction in this manner, the robot 10 can be operated in only a non-interference direction. To be noted, the manipulation buttons may be eliminated from the display instead of making the manipulation buttons transparent.

As described above, according to the second embodiment, in the teaching pendant 30, a situation in which the user performs manipulation to operate the robot 10 in the interference direction can be avoided. As a result of this, an excessive load is not applied to the robot 10, and the robot 10 can be efficiently restored from the interfering state.

Figure 10:
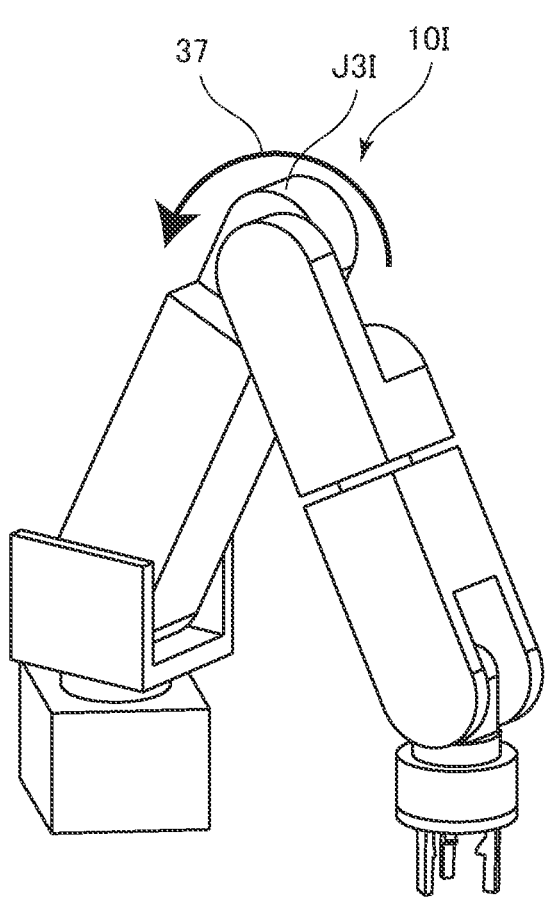
FIG. 10 is an explanatory diagram of an example of a display image according to the second embodiment.

Although a case of the tool coordinate system has been described as an example in the above description, the same applies to a joint coordinate system. FIG. 10 is an explanatory diagram of an example of a display image according to the second embodiment. For example, the CPU 301 may display, as information of the manipulation direction, a model image 37 that is an arrow image directed in the manipulation direction on the touch panel display 304 in association with the robot image 101 as illustrated in FIG. 10. In the example of FIG. 10, the direction D12 of the joint J3 of the robot 10 illustrated in FIG. 7 is the manipulation direction, and the model image 37 indicating the information of the manipulation direction is displayed in the vicinity of a joint image J31 corresponding to the joint J3. At this time, the CPU 301 may function the model image 37 as a manipulation button for instructing the robot 10 to operate in the manipulation direction. To be noted, the second embodiment and/or modification examples thereof and the first embodiment and/or modification examples thereof described above may be implemented in combination.

Third Embodiment

A third embodiment will be described. To be noted, in the third embodiment, description of elements substantially the same as in the first and second embodiments will be simplified or omitted. The configuration of the robot system according to the third embodiment is as that described in the first embodiment.

Figure 11:
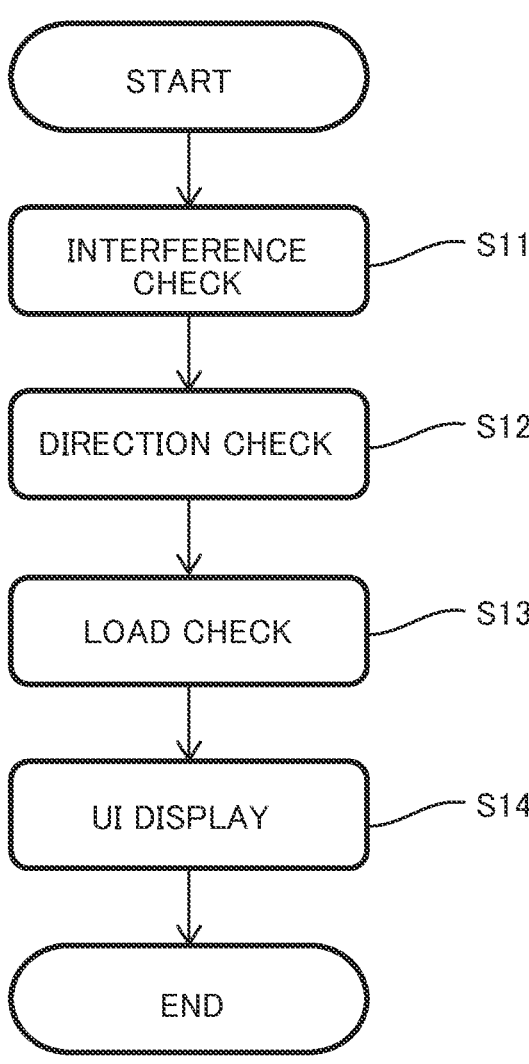
FIG. 11 is a flowchart illustrating a control method for a teaching pendant according to a third embodiment.

FIG. 11 is a flowchart illustrating a control method for the teaching pendant 30 according to the third embodiment. Processing of steps S11 and S12 is substantially the same as in the processing of steps S1 and S2 illustrated in FIG. 6.

In load checking processing of step S13, in the case where it has been determined in step S12 that the robot 10 is receiving a load in a plurality of directions, the CPU 301 selects the largest load in the obtained plurality of loads, and specifies the direction of the largest load. The CPU 301 determines the manipulation direction on a basis of the direction in which the robot 10 is receiving the largest load. That is, CPU 301 determines the direction in which the largest load that the robot 10 is receiving decreases as the manipulation direction.

The processing of step S14 is substantially the same as the processing of step S3. In the third embodiment, in step S14, the CPU 301 displays information of the determined manipulation direction of the robot 10 on the touch panel display 304.

Figure 12:
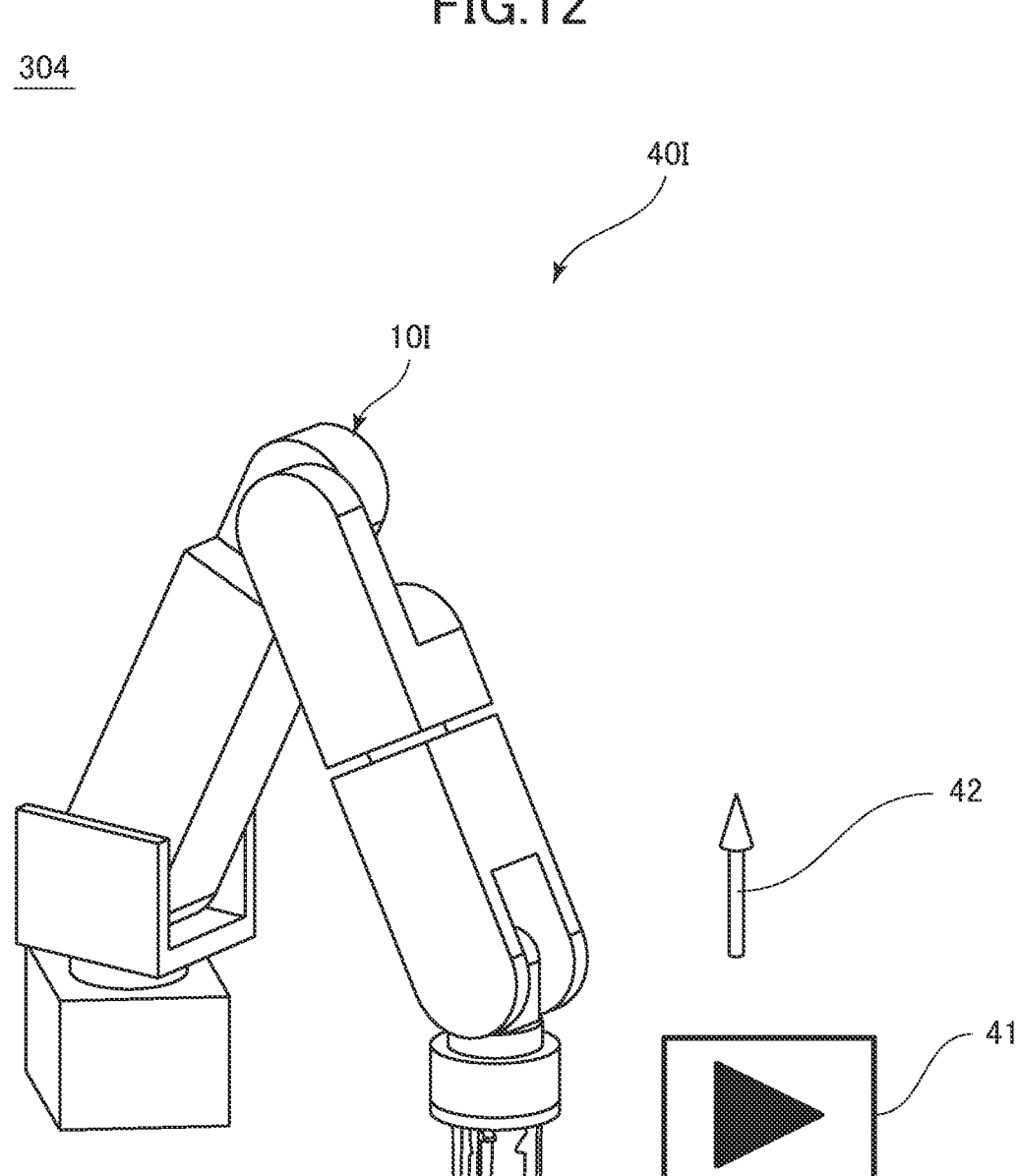
FIG. 12 is an explanatory diagram of an example of a display image according to the third embodiment.

FIG. 12 is an explanatory diagram of an example of a display image according to the third embodiment. FIG. 12 illustrates a UI image 401 displayed on the touch panel display 304, and the robot image 101 substantially the same as in FIG. 3 is displayed on the touch panel display 304 as part of the UI image 401. The UI image 401 includes a manipulation button 41, and an arrow image 42 indicating the manipulation direction. The user can operate the actual robot 10 in the operation direction corresponding to the arrow image 42 by touching, that is, manipulating the manipulation button 41.

The CPU 301 preferably displays animation of the operation of the robot image 101 in the manipulation direction corresponding to the arrow image 42. That is, the CPU 301 performs simulation of the operation on the basis of 3D model data corresponding to the robot 10, and displays the result thereof as animation on the touch panel display 304. As a result of this, the user can easily recognize the operation of the robot image 101 in the manipulation direction indicated by the arrow image 42 as animation before executing the operation of the robot 10.

As described above, according to the third embodiment, in the teaching pendant 30, a situation in which the user performs manipulation to operate the robot 10 in the interference direction can be avoided. As a result of this, an excessive load is not applied to the robot 10, and the robot 10 can be efficiently restored from the interfering state. To be noted, the third embodiment and/or modification examples thereof and the various embodiments and/or modification examples thereof described above may be implemented in combination.

The present disclosure is not limited to the embodiments described above, and embodiments can be modified in many ways within the technical concept of the present disclosure. In addition, the effects described in the embodiments are merely enumeration of the most preferable effects that can be obtained from embodiments of the present disclosure, and the effects of embodiments of the present disclosure are not limited to those described in the embodiments.

Although a case where the robot arm 101 is a vertically articulated robot arm has been described in the embodiments described above, the configuration is not limited to this. For example, various robot arms such as a horizontally articulated robot arm, a parallel link robot arm, and an orthogonal robot may be used as the robot arm 101. In addition, the present disclosure is applicable to machines capable of automatically performing an operation such as extension, bending, vertical movement, horizontal movement, or turning or a composite operation of these on the basis of information in a storage device provided in a control device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-024424, filed Feb. 21, 2022, and Japanese Patent Application No. 2023-014379, filed Feb. 2, 2023, which are hereby incorporated by reference herein in their entirety.

What is claimed is:

1. A manipulation apparatus configured to manipulate a robot, the manipulation apparatus comprising:

a processor configured to:

display a user interface image including a plurality of manipulation buttons on a display portion, each manipulation button of the plurality of manipulation buttons corresponding to a respective direction of a plurality of directions of movement of the distal end of the robot, wherein, based on selection of one or more manipulation buttons among the plurality of manipulation buttons on the display portion, the processor is configured to instruct the distal end of the robot to operate in the respective directions corresponding to the selected one or more manipulation buttons;

determine one or more directions in which the robot is not permitted to move based on a load that the robot is receiving from an object being maintained or increased;

display, on the display portion, a first manipulation button of the plurality of manipulation buttons corresponding to a first direction in which the robot is permitted to move and a second manipulation button of the plurality of manipulation buttons corresponding to a second direction in which the robot is not permitted to move, the first manipulation button comprising a first image displayed in a first display form, the second manipulation button comprising a second image displayed in a second display form different from the first display form, wherein the determined one or more directions in which the robot is not permitted to move includes the second direction and does not include the first direction; and output a command to move the distal end of the robot in the first direction in response to a user's selection of the first manipulation button on the display portion.

2. The manipulation apparatus according to claim 1, wherein the processor is configured to not accept a manipulation in a direction other than the first direction.

3. The manipulation apparatus according to claim 1, wherein the first direction is a direction in which the load that the robot is receiving from the object decreases.

4. The manipulation apparatus according to claim 1, wherein the processor is configured to specify a direction in which the robot is receiving the load, at a joint receiving the load among a plurality of joints of the robot.

5. The manipulation apparatus according to claim 1, wherein the processor is configured to specify a direction in which the robot is receiving the load, at an end effector of the robot.

6. The manipulation apparatus according to claim 1, wherein the processor is configured to determine the first direction on a basis of a direction in which the robot is receiving the largest load among directions in which the robot is receiving the load.

7. The manipulation apparatus according to claim 1, wherein the user interface image includes the first manipulation button for instructing the robot to operate in the first direction.

8. The manipulation apparatus according to claim 1, wherein the processor is configured to:

display, on the display portion, the plurality of manipulation buttons for instructing the robot to operate in different directions; and in a case where the robot interferes with the object, not accept a manipulation on a manipulation button for instructing the robot to operate in a direction other than the first direction among the plurality of manipulation buttons.

9. The manipulation apparatus according to claim 1, wherein the processor is configured to display a robot image corresponding to the robot on the display portion.

10. The manipulation apparatus according to claim 9, wherein, in the robot image, a portion corresponding to a part of the robot receiving the load is displayed in a color different from colors of other parts.

11. The manipulation apparatus according to claim 9, wherein the processor is configured to display animation indicating an operation in the first direction in the robot image.

12. The manipulation apparatus according to claim 1, wherein the processor is configured to eliminate the second manipulation button corresponding to the second direction on the display portion.

13. The manipulation apparatus according to claim 1, wherein the processor is configured to transparently display the second manipulation button corresponding to the second direction on the display portion.

14. The manipulation apparatus according to claim 1, wherein the processor is configured to display the second manipulation button corresponding to the second direction grayed out on the display portion.

15. The manipulation apparatus according to claim 1, wherein the processor is configured to display a three-dimensional handle model on the display portion as the user interface image.

16. The manipulation apparatus according to claim 1, wherein the processor is configured to display an operation instruction portion that allows a user to provide one or more inputs to cause the robot to perform a jog operation.

17. The manipulation apparatus according to claim 1, wherein the processor is configured to display an arrow on the display portion in a vicinity of the robot as the first image corresponding to the first direction.

18. The manipulation apparatus according to claim 1, wherein the first direction is a direction in which the load that the robot receives from the object decreases in a situation in which the robot is in contact with the object, and wherein the second direction is a direction in which the load that the robot receives from the object increases or remains constant in the situation in which the robot is in contact with the object.

19. The manipulation apparatus according to claim 1, wherein robot includes a detection portion that detects contact with the object, wherein the processor is configured to specify a direction of the load that the robot receives from the object on a basis of a detection result of the detection portion, and wherein the processor is configured to specify the first direction and the second direction on a basis of the direction of the load.

20. A robot system comprising:

a robot; and a manipulation apparatus configured to manipulate the robot, wherein the manipulation apparatus includes a processor configured to:

display a user interface image including a plurality of manipulation buttons on a display portion, each manipulation button of the plurality of manipulation buttons corresponding to a respective direction of a plurality of directions of movement of the distal end of the robot, wherein, based on selection of one or more manipulation buttons among the plurality of manipulation buttons on the display portion, the processor is configured to instruct the distal end of the robot to operate in the respective directions corresponding to the selected one or more manipulation buttons;

determine one or more directions in which the robot is not permitted to move based on a load that the robot is receiving from an object being maintained or increased;

display, on the display portion, a first manipulation button of the plurality of manipulation buttons corresponding to a first direction in which the robot is permitted to move and a second manipulation button of the plurality of manipulation buttons corresponding to a second direction in which the robot is not permitted to move, the first manipulation button comprising a first image displayed in a first display form, the second manipulation button comprising a second image displayed in a second display form different from the first display form, wherein the determined one or more directions in which the robot is not permitted to move includes the second direction and does not include the first direction; and output a command to move the distal end of the robot in the first direction in response to a user's selection of the first manipulation button on the display portion.

21. A control method for a robot system including a robot and a manipulation apparatus configured to manipulate the robot, the control method comprising:

controlling the robot of the robot system in accordance with an instruction from the manipulation apparatus, wherein the manipulation apparatus includes a processor configured to:

display a user interface image including a plurality of manipulation buttons on a display portion, each manipulation button of the plurality of manipulation buttons corresponding to a respective direction of a plurality of directions of movement of the distal end of the robot, wherein, based on selection of one or more manipulation buttons among the plurality of manipulation buttons on the display portion, the processor is configured to instruct the distal end of the robot to operate in the respective directions corresponding to the selected one or more manipulation buttons;

determine one or more directions in which the robot is not permitted to move based on a load that the robot is receiving from an object being maintained or increased;

display, on the display portion, a first manipulation button of the plurality of manipulation buttons corresponding to a first direction in which the robot is permitted to move and a second manipulation button of the plurality of manipulation buttons corresponding to a second direction in which the robot is not permitted to move, the first manipulation button comprising a first image displayed in a first display form, the second manipulation button comprising a second image displayed in a second display form different from the first display form, wherein the determined one or more directions in which the robot is not permitted to move includes the second direction and does not include the first direction; and output a command to move the distal end of the robot in the first direction in response to a user's selection of the first manipulation button on the display portion.

22. A manufacturing method for a product, the manufacturing method comprising:

manufacturing the product by using a robot system including a robot and a manipulation apparatus configured to manipulate the robot, wherein the manipulation apparatus includes a processor configured to:

display a user interface image including a plurality of manipulation buttons on a display portion, each manipulation button of the plurality of manipulation buttons corresponding to a respective direction of a plurality of directions of movement of the distal end of the robot, wherein, based on selection of one or more manipulation buttons among the plurality of manipulation buttons on the display portion, the processor is configured to instruct the distal end of the robot to operate in the respective directions corresponding to the selected one or more manipulation buttons;

determine one or more directions in which the robot is not permitted to move based on a load that the robot is receiving from an object being maintained or increased;

display, on the display portion, a first manipulation button of the plurality of manipulation buttons corresponding to a first direction in which the robot is permitted to move and a second manipulation button of the plurality of manipulation buttons corresponding to a second direction in which the robot is not permitted to move, the first manipulation button comprising a first image displayed in a first display form, the second manipulation button comprising a second image displayed in a second display form different from the first display form, wherein the determined one or more directions in which the robot is not permitted to move includes the second direction and does not include the first direction; and output a command to move the distal end of the robot in the first direction in response to a user's selection of the first manipulation button on the display portion.

23. A control method for a manipulation apparatus configured to manipulate a robot, the control method comprising:

displaying a user interface image including a plurality of manipulation buttons on a display portion, each manipulation button of the plurality of manipulation buttons corresponding to a respective direction of a plurality of directions of movement of the distal end of the robot, wherein, based on selection of one or more manipulation buttons among the plurality of manipulation buttons on the display portion, the processor is configured to instruct the distal end of the robot to operate in the respective directions corresponding to the selected one or more manipulation buttons;

determining a direction one or more directions in which the robot is not permitted to move based on a load that the robot is receiving from an object being maintained or increased;

displaying, on the display portion, a first manipulation button of the plurality of manipulation buttons corresponding to a first direction in which the robot is permitted to move and a second manipulation button of the plurality of manipulation buttons corresponding to a second direction in which the robot is not permitted to move, the first manipulation button comprising a first image displayed in a first display form, the second manipulation button comprising a second image displayed in a second display form different from the first display form, wherein the determined one or more directions in which the robot is not permitted to move includes the second direction and does not include the first direction; and outputting a command to move the distal end of the robot in the first direction in response to a user's selection of the first manipulation button on the display portion.

24. A non-transitory computer-readable recording medium storing a control program for causing a computer to execute a control method for causing a computer to execute a control method for a manipulation apparatus configured to manipulate a robot, the control method comprising:

displaying a user interface image including a plurality of manipulation buttons on a display portion, each manipulation button of the plurality of manipulation buttons corresponding to a respective direction of a plurality of directions of movement of the distal end of the robot, wherein, based on selection of one or more manipulation buttons among the plurality of manipulation buttons on the display portion, the processor is configured to instruct the distal end of the robot to operate in the respective directions corresponding to the selected one or more manipulation buttons;

determining one or more directions in which the robot is not permitted to move based on a load that the robot is receiving from an object being maintained or increased;

displaying, on the display portion, a first manipulation button of the plurality of manipulation buttons corresponding to a first direction in which the robot is permitted to move and a second manipulation button of the plurality of manipulation buttons corresponding to a second direction in which the robot is not permitted to move, the first manipulation button comprising a first image displayed in a first display form, the second manipulation button comprising a second image displayed in a second display form different from the first display form, wherein the determined one or more directions in which the robot is not permitted to move includes the second direction and does not include the first direction; and outputting a command to move the distal end of the robot in the first direction in response to a user's selection of the first manipulation button on the display portion.

* * * * *